US012572442B2

(12) United States Patent (10) Patent No.: US 12,572,442 B2
Antinori et al. (45) Date of Patent: Mar. 10, 2026

(54) COMPUTATIONAL PROBE AUTO-TUNING

(71) Applicant: Red Hat, Inc., Raleigh, NC (US)

(72) Inventors: Paolo Antinori, Novara (IT); Andrea Peruffo, Lisbon (PT)

(73) Assignee: Red Hat, LLC, Raleigh, NC (US)

( * ) Notice: Subject to any disclaimer, the term of this patent is extended or adjusted under 35 U.S.C. 154(b) by 123 days.

(21) Appl. No.: 18/370,537

(22) Filed: Sep. 20, 2023

(65) Prior Publication Data

US 2025/0094310 A1 Mar. 20, 2025

(51) Int. Cl.
*G06F 11/34* (2006.01)
*G06F 11/30* (2006.01)

(52) U.S. Cl.
CPC ...... *G06F 11/3466* (2013.01); *G06F 11/3051* (2013.01)

(58) Field of Classification Search
CPC ............. G06F 11/3466; G06F 11/3051; G06F 11/113051; G06F 11/113055
See application file for complete search history.

(56) References Cited

U.S. PATENT DOCUMENTS

| | | | | | |
|---|---|---|---|---|---|
| 8,782,641 | B2 * | 7/2014 | Cotner | ................ | G06F 11/3433 718/100 |
| 11,204,840 | B2 * | 12/2021 | Nair | ......................... | H04L 41/40 |
| 2004/0181794 | A1 * | 9/2004 | Coleman | ............... | G06F 11/008 718/104 |
| 2009/0210360 | A1 * | 8/2009 | Sankar | ................ | G06F 9/44505 706/47 |
| 2019/0391897 | A1 * | 12/2019 | Vijendra | ................ | G06N 20/00 |
| 2020/0244758 | A1 * | 7/2020 | Enguehard | .......... | H04L 67/5682 |
| 2020/0252281 | A1 * | 8/2020 | Abhyankar | ........... | H04L 41/083 |
| 2022/0147381 | A1 * | 5/2022 | Gao | .................... | G06F 9/45558 |

OTHER PUBLICATIONS

James Walker, "Kubernetes Startup Probe—a Practical Guide", KUBERNETES, Apr. 18, 2022, accessed on Aug. 31, 2023, accessed at: https://www.containiq.com/post/kubernetes-startup-probe, 14 pages.

* cited by examiner

*Primary Examiner* — Ashish Thomas
*Assistant Examiner* — Catherine Marie Nguyen
(74) *Attorney, Agent, or Firm* — Kilpatrick Townsend & Stockton LLP

(57) ABSTRACT

Systems, methods, and apparatuses for automatically tuning computational probe threshold values in a containerized computing environment are provided herein. An example method comprises identifying a computational container environment that is operating outside of at least one predefined window of values of at least one performance metric, measuring the at least one performance metric, automatically adjusting at least one parameter value of a probe based upon the at least one performance metric, and iterating the measuring and adjusting until the computational container environment is operating within the at least one predefined window of values.

20 Claims, 5 Drawing Sheets

200

Identify a computational container environment that is operating outside of one or more predefined windows of values of one or more performance metrics
202

Measure the one or more performance metrics
204

Automatically adjust one or more parameter values of a probe based upon the performance metrics
206

Repeat the measuring and adjusting until the computational container environment is operating within the one or more predefined windows of values
208

100

200

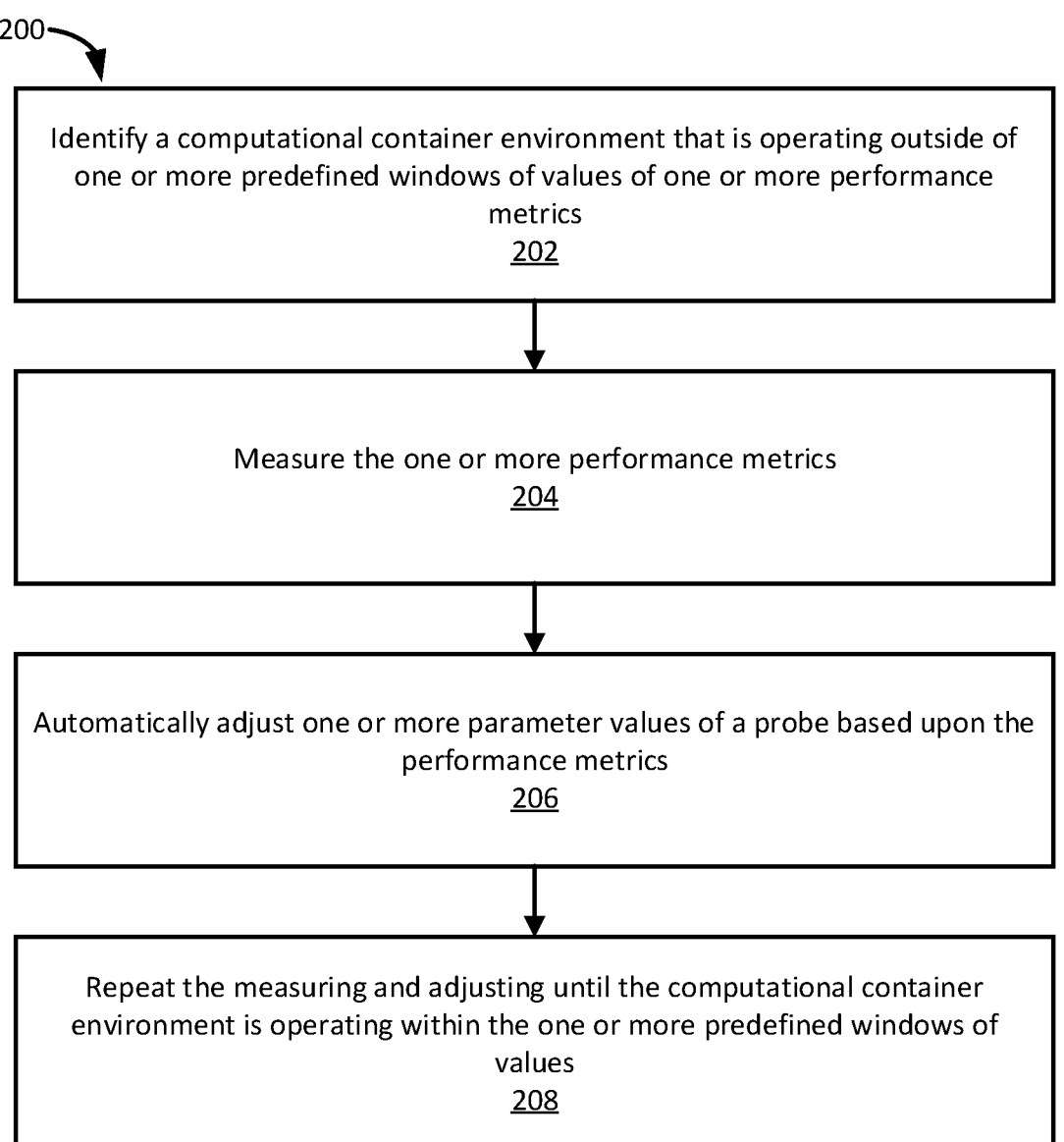

Identify a computational container environment that is operating outside of one or more predefined windows of values of one or more performance metrics
202

Measure the one or more performance metrics
204

Automatically adjust one or more parameter values of a probe based upon the performance metrics
206

Repeat the measuring and adjusting until the computational container environment is operating within the one or more predefined windows of values
208

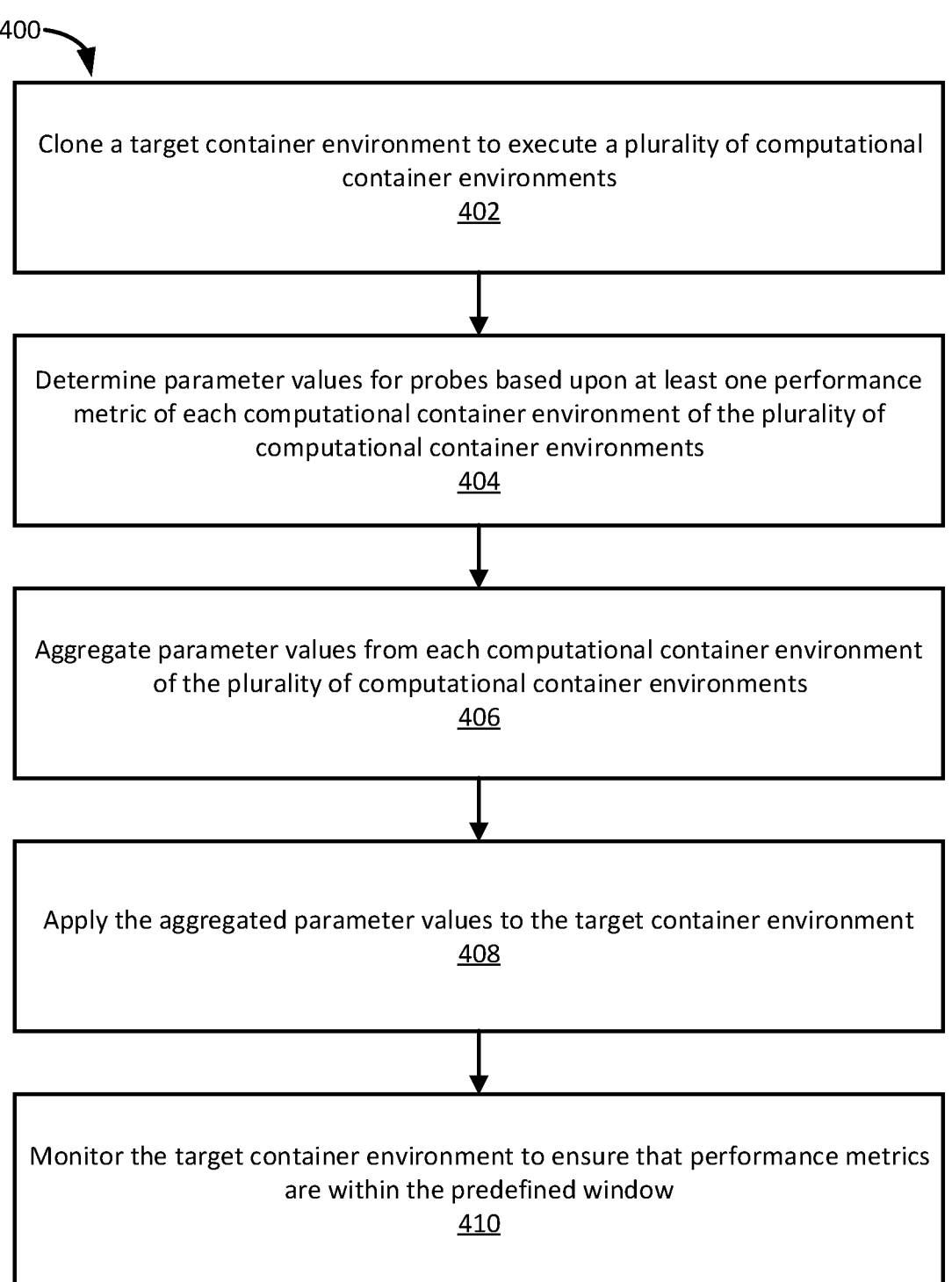

Clone a target container environment to execute a plurality of computational container environments
402

Determine parameter values for probes based upon at least one performance metric of each computational container environment of the plurality of computational container environments
404

Aggregate parameter values from each computational container environment of the plurality of computational container environments
406

Apply the aggregated parameter values to the target container environment
408

Monitor the target container environment to ensure that performance metrics are within the predefined window
410

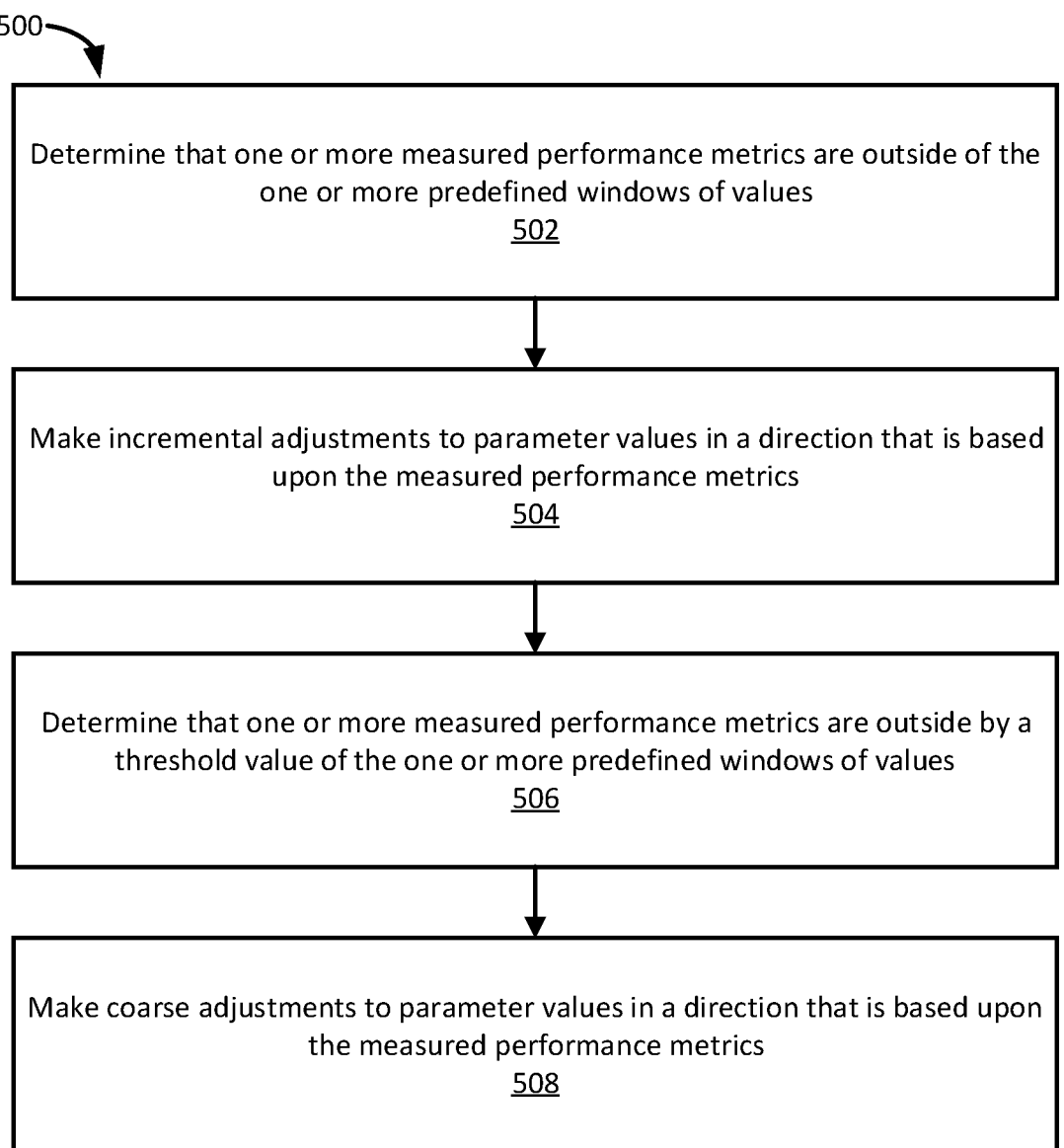

Determine that one or more measured performance metrics are outside of the one or more predefined windows of values
502

Make incremental adjustments to parameter values in a direction that is based upon the measured performance metrics
504

Determine that one or more measured performance metrics are outside by a threshold value of the one or more predefined windows of values
506

Make coarse adjustments to parameter values in a direction that is based upon the measured performance metrics
508

Figure 5

COMPUTATIONAL PROBE AUTO-TUNING

BACKGROUND

In containerized computing environments, probes are often used to monitor performance of individual containers. Probes typically measure one or more characteristics of a container (e.g. a time after startup at which the container is ready to accept requests, whether an application that is already running can handle requests, whether the container is operating correctly, etc.) to determine whether an action should be taken (e.g. restarting the container, limiting traffic to the container, etc.). Determinations as to whether an action should be taken are generally made based upon threshold values provided to a probe which correspond to measurements of the characteristics of the container.

SUMMARY

Systems, methods, and apparatuses are provided for automatically tuning computational probe threshold values in a containerized computing environment. In an example, a method comprises identifying a computational container environment that is operating outside of at least one predefined window of values of at least one performance metric, measuring the at least one performance metric, automatically adjusting at least one parameter value of a probe based upon the at least one performance metric, and iterating the measuring and adjusting until the computational container environment is operating within the at least one predefined window of values.

In another example, a system includes a memory and a processing device operatively coupled to the memory to identify a computational container environment that is operating outside of at least one predefined window of values of at least one performance metric, measure the at least one performance metric, automatically adjust at least one parameter value of a probe based upon the at least one performance metric, and iterate the measuring and adjusting until the computational container environment is operating within the at least one predefined window of values.

In yet another example, a non-transitory computer-readable medium stores instructions which, when executed by a processing device, cause the processing device to identify a computational container environment that is operating outside of at least one predefined window of values of at least one performance metric, measure the at least one performance metric, automatically adjust at least one parameter value of a probe based upon the performance metric, and iterate the measuring and adjusting until the computational container environment is operating within the at least one predefined window of values.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure, wherein:

FIG. 2 illustrates a flowchart for an example method for automatically tuning probe parameter values, according to example embodiments of the present disclosure.

FIG. 4 illustrates a flowchart for an example method for automatically tuning probe values based upon behavior of a cloned container environment, according to example embodiments of the present disclosure.

FIG. 5 illustrates a flowchart for an example method for adjusting parameter values based upon current deviation from a desired behavior, according to example embodiments of the present disclosure.

DETAILED DESCRIPTION

Figure 1:
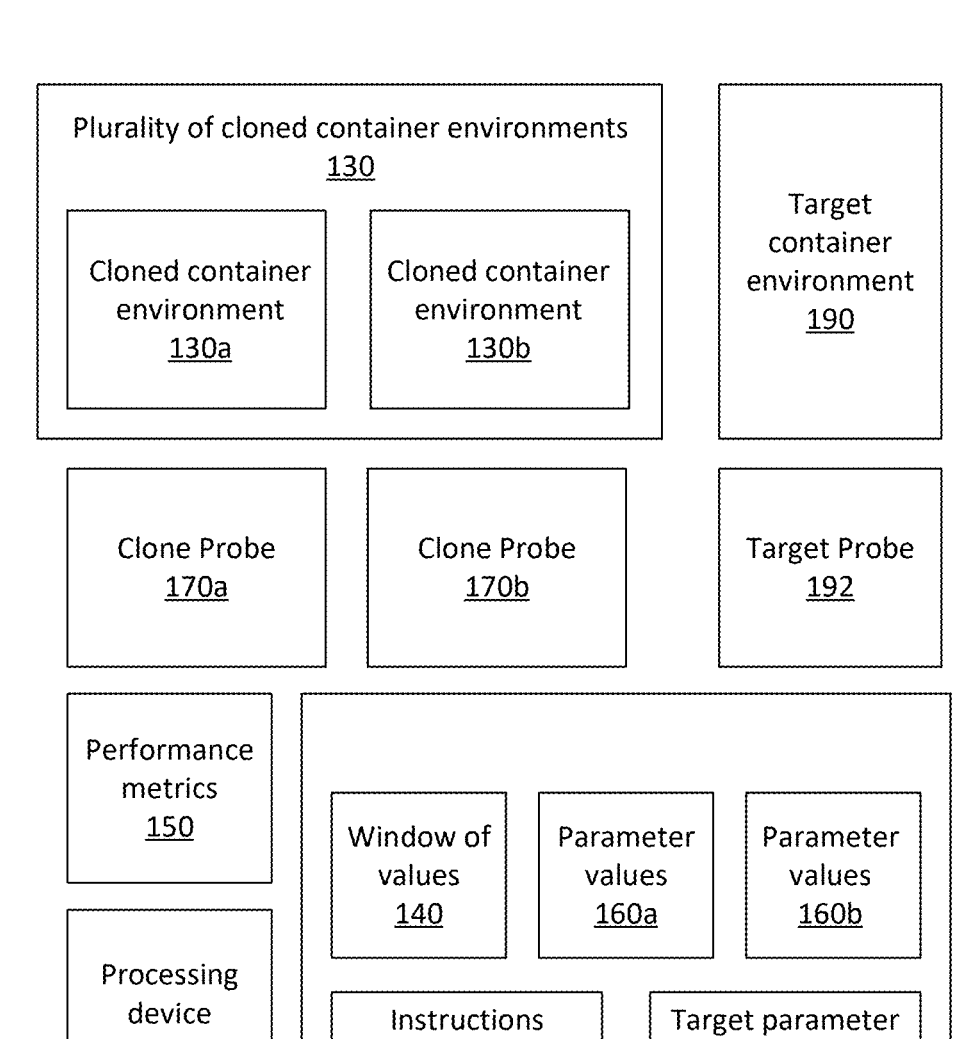
FIG. 1 illustrates an example containerized computing system, according to example embodiments of the present disclosure.

Techniques are disclosed herein for automatically tuning computational probe threshold values in a containerized computing environment. Containerized computing environments, especially those which execute large quantities of containers to provide one or more services at scale in a cloud-based configuration, may require monitoring of each of a plurality of individual containers to determine when traffic can be routed to a given container or if a container should be restarted. Because many containers may execute simultaneously, it is generally impractical to manually monitor every container. Instead, one or more probes associated with each container typically monitor a respective container's behavior to automatically determine whether action should be taken.

These probes must be properly configured in order to make accurate determinations regarding the respective container. Determinations about whether or not to take an action are generally governed by one or more parameter values of a probe, and these parameter values must be tuned to a specific application in order for the probe to function properly. Tuning these parameter values is a time-consuming process of trial and error that requires the attention of a skilled individual with knowledge of container behavior and probe functionality. Additionally, variations in particular deployment environments means that parameter values which work well for one deployment of a given service may not work well for a subsequent deployment of the same service, even when all variables are theoretically consistent, and conditions can change within a single deployment over time requiring adjustments to probe parameters. For example, some applications exhibit performance characteristics dependent upon an amount of data stored, causing overall performance to degrade over time. In such a scenario, a container restart or traffic restriction may be undesirable since doing so may slow or prevent the application from completing a desired task, and thus one or more probe parameters may need to be adjusted to prevent undesirable behavior.

Systems, methods, and apparatuses of the present disclosure allow for automatic adjustment of probe parameters to satisfy one or more target windows of values for one or more performance metrics of a computational container environment. A plurality of computational container environments can be simultaneously monitored, and when a computational container environment which is operating outside of target windows of values for performance metrics is identified, probe parameters can be automatically adjusted with an automated feedback loop until the computational container environment is operating as desired. The feedback loop can be automated using an in-cluster agent like an operator which is responsible for identifying the target workloads to improve, cloning the target workloads, tweaking probes of the target workloads, and redeploying the probes.

The operator may operate in one of two different modes. In an auto-tuning mode, the operator may observe a deployment (e.g. StatefulSet) and repeatedly restart the deployment to measure possible parameter values to use for the probes. This can be implemented using heuristics. In an in-production mode, the operator may continue to monitor the deployment in production so that, observing normal procedures including but not limited to upgrades and rolling restarts, the operator can propose improvements over current probe parameter values. Observing a pod lifecycle in a live environment is important to further tweak the probes to account for variables such as but not limited to a real-time workload, production-ready components (e.g. databases), noisy neighbors, and effects of autoscaling events. These elements are extremely hard to reproduce in a testing environment, but, the operator can observe and compare current data with raw data previously collected during the autotuning procedures. From the observation the operator can apply (or propose to apply) fixed corrections to the original probes values.

The advantages offered by having more accurate probes can improve the current situation, such as but not limited to quicker "ready" detection which can dramatically reduce upgrade times and resource consumption during upgrades, quicker "failure" detection which can save time in debugging and prevent attack vectors (like denial of service), better resilience and tolerance for environmental changes without causing errors and cascading effects, and improvements in overall efficiency.

The performance metrics may include but are not limited to correctness (workload activates correctly), time to start up, resilience, and failures detection. The performance metrics can be measured, and systems, methods, and apparatuses of the present disclosure may dynamically adjust a parameter of a corresponding probe based upon a deviation of the performance metric from the target window of values. This process may be iterated to accurately achieve a stable target value of the performance metric. Further, this process may be performed on a cloned instance of the computational computing environment. By performing analysis on a cloned instance rather than a deployed instance, adjustments can be made rapidly without interfering with the deployed instance until proper parameter values have been determined.

FIG. 1 illustrates an example containerized computing system 100, according to example embodiments of the present disclosure. A processing device 110, operatively coupled to a memory 120, executes a target container environment 190 and a plurality of cloned container environments 130. The plurality of cloned container environments 130 includes first cloned container environment 130*a* and a second cloned container environment 130*b*.

A target probe 192 associated with the target container environment 190, a first clone probe 170*a* associated with the first cloned container environment 130*a*, and a second clone probe 170*b* associated with the second cloned container environment 130*b* monitor their respective containers. First parameter values 160*a* govern execution of the first clone probe 170*a*, second parameter values 160*b* govern execution of the second clone probe 170*b*, and one or more target parameter values 194 govern execution of the target probe 192. The first parameter values 160*a*, the second parameter values 160*b*, and the target parameter values 194 are held in the memory 120, and may be stored in a non-volatile storage.

The memory 120 also holds instructions 180 for the processing device 110 and at least one window of values 140. The at least one window of values 140 include at least one target range for one or more performance metrics 150 of the plurality of cloned container environments 130 and the target container environment 190. The processing device 110 measures the performance metrics 150 and compares the performance metrics 150 with the window of values 140 to determine whether the target container environment 190 and/or the plurality of cloned container environments 130 are operating as desired.

FIG. 2 illustrates a flowchart for an example method 200 for automatically tuning probe parameter values, according to example embodiments of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, one or more blocks may be repeated, and some of the blocks described are optional. The method 200 may be performed by processing logic that may comprise hardware (circuitry, dedicated logic, etc.), software, or a combination of both.

At block 202, an example processing device identifies a computational container environment that is operating outside of at least one predefined window of values of at least one performance metric. For example, a processing device 110 may determine that a target container environment 190 which executes an application that modifies images processes requests to modify images quickly enough that requests can be routed to the target container environment 190 before the application is completely ready to start processing the requests. The processing device 110 may determine that a period of time in which a target probe 192 prevents requests from being sent to the target container environment 190 is long enough that, due to periodic restarts of the target container environment 190, the performance metric 150 (e.g. a rate of request processing) has fallen below an acceptable window of values 140. The target probe 192 may be a Kubernetes probe, in this example the target probe 192 is a Kubernetes startup probe. Other embodiments may include Kubernetes readiness or liveliness probes.

At block 204, the example processing device measures the one or more performance metrics. For example, the processing device 110 may determine that the performance metric 150 (e.g. the measured rate of request processing) for the target container environment 190 is five requests per second over a period of one minute, while a lower bound of the window of values 140 specifies a request processing rate of at least six requests per second over a period of one minute.

At block 206, the example processing device automatically adjusts at least one parameter value of a probe based upon the at least one performance metric. For example, the processing device 110 may determine that because the performance metric 150 (e.g. the measured rate of request processing) is below the window of values 140, a target parameter value 194 (e.g. a period of time after restart in which the target container environment 190 does not accept requests) should be reduced in order to bring the performance metric 150 back within the window of values 140.

At block 208, the example processing device iterates the measuring and adjusting until the computational container environment is operating within the at least one predefined window of values. For example, the processing device 110 may decrement the target parameter value 194 by a predetermined interval (e.g. from 20 ms to 18 ms; a decrement of 2 ms) responsive to the determination in block 206. This decrement may be insufficient to achieve a performance metric 150 value that lies within the window of values 140, and so the processing deice may repeat blocks 204 and 206 until an acceptable performance metric 150 value is reached. When the decrement causes the performance metric 150 value to skip the window of values 140 entirely (e.g. the performance metric 150 value goes from being below the window of values 140 to above the window of values 140 in a single increment or decrement), the processing device 110 may increment or decrement by a smaller value (e.g. 1 ms instead of 2 ms) in order to attempt to achieve a desired performance metric 150 value.

Figure 3:
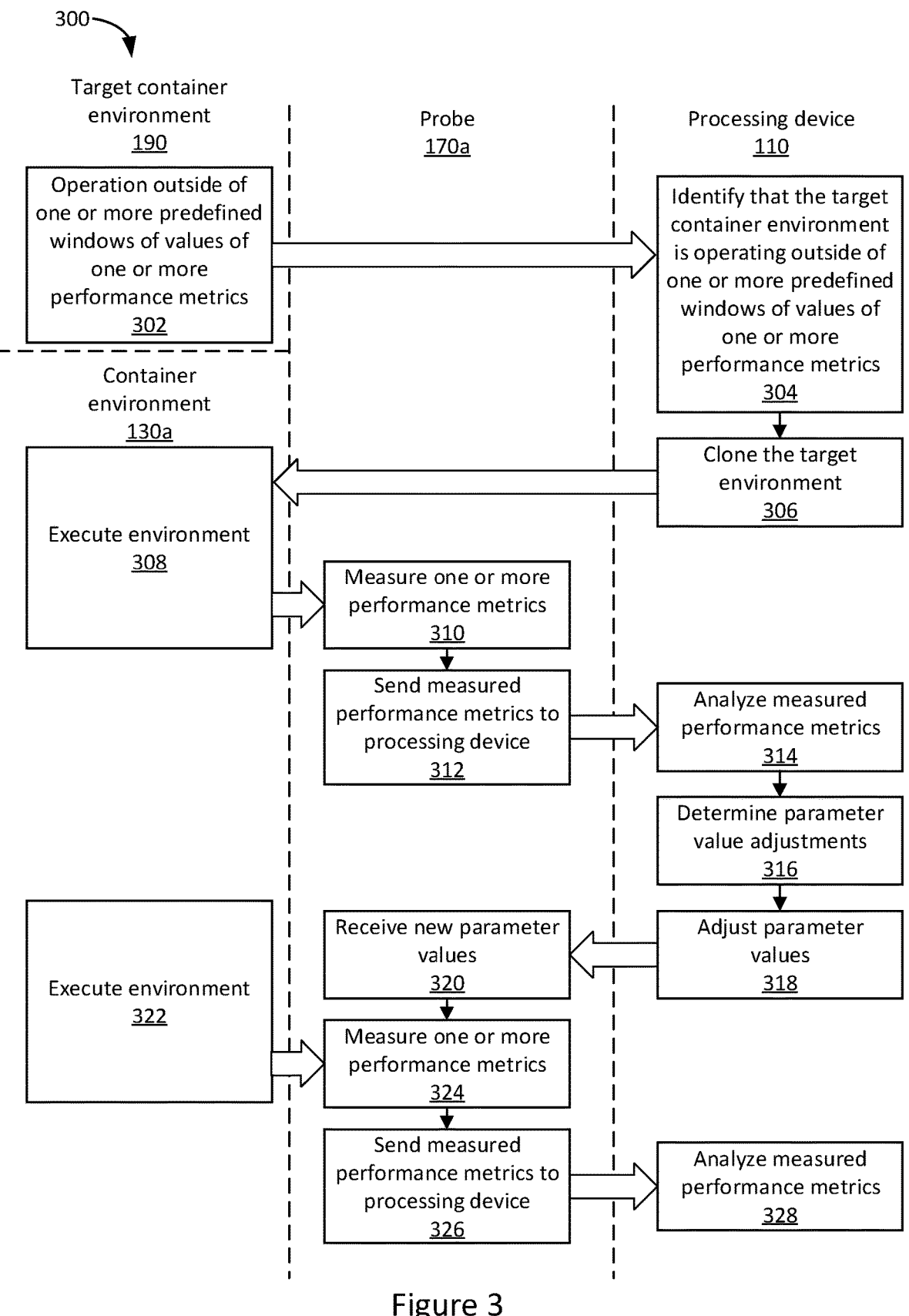
FIG. 3 illustrates an example timing diagram for a system for automatically tuning probe values, according to example embodiments of the present disclosure.

FIG. 3 illustrates an example timing diagram 300 for a system for automatically tuning probe values, according to example embodiments of the present disclosure. Although the example system for automatically tuning probe values is described with reference to the timing diagram 300 illustrated in FIG. 3, it will be appreciated that many other systems for and methods of performing the acts associated with the timing diagram 300 may be used. For example, the order of some of the blocks may be changed, certain blocks may be combined with other blocks, one or more blocks may be repeated, and some of the blocks described are optional. The acts associated with the timing diagram 300 may be performed by processing logic that may comprise hardware (circuitry, dedicated logic, etc.), software, or a combination of both.

A target container environment 190 for calculating tax returns operates outside of one or more predefined windows of values 140 of one or more performance metrics 150 (block 302). For example, the target container environment 190 may require too many restarts per rolling 10-second period, triggered by a liveliness target probe 192. A processing device 110 detects this (block 304), and clones the target container environment 190 (block 306) in order to determine what target parameter value 194 adjustments should be made without disrupting the target container environment 190, which continues to process requests in a deployed state.

A cloned container environment 130a created by the processing device 110 begins execution (block 308). The cloned container environment 130a is created by copying a state of the target container environment 190 exactly and beginning execution while sending a similar volume of requests to the cloned container environment 130a to that which is being received by the target container environment 190, thereby replicating a deployment environment of the target container environment 190. The processing device 110 may route copies of requests sent to the target container environment 190 to the cloned container environment 130a to more accurately replicate a demand for the target container environment 190.

A clone probe 170a, identical to a target probe 192, is created by the processing device 110 to monitor the cloned container environment 130a. The clone probe 170a may be configured to measure one or more performance metrics 150 (e.g. a rate of restarts) of the cloned container environment 130a (block 310) and send the measured performance metrics 150 to the processing device 110 (block 312). The processing device 110 may then analyze the measured performance metrics 150 (block 314) and determine one or more adjustments of one or more parameter values 160a (e.g. an increase of a liveliness threshold indicative of an amount of time in which the cloned container environment 130a is non-responsive before a restart is triggered) of the clone probe 170a (block 316). The processing device 110 may then make appropriate adjustments to the one or more parameter values 160a (block 318) and send updated parameter values 160a to the clone probe 170a. The clone probe 170a receives the updated parameter values 160a (block 320) and the cloned container environment 130a begins execution again (block 322).

The cloned container environment 130a may continue execution with copied requests from the target container environment 190, or may repeat execution with requests identical to those processed at block 308. The clone probe 170a employs the updated parameter values 160a to determine when restarts of the cloned container environment 130a are required, and measures the one or more performance metrics 150 (block 324). The clone probe 170a sends these measured performance metrics 150 to the processing device 110 (block 326), which analyzes the measured performance metrics 150 to determine whether further adjustment of the parameter values 160a is needed (block 328). If further adjustment is needed, blocks 316 through 328 are repeated until the measured performance metrics 150 are within the window of values 140. If no further adjustment is needed, the target parameter values 194 are updated to match the parameter values 160a and execution of the cloned container environment 130a is terminated.

FIG. 4 illustrates a flowchart for an example method 400 for automatically tuning probe values based upon behavior of a cloned container environment, according to example embodiments of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, one or more blocks may be repeated, and some of the blocks described are optional. The method 400 may be performed by processing logic that may comprise hardware (circuitry, dedicated logic, etc.), software, or a combination of both.

At block 402, an example processing device clones a target container environment to execute a plurality of computational container environments. For example, a processing device 110 may determine that a target container environment 190 for processing audio is diverting requests at a rate that is above an acceptable window of values 140, and thus an adjustment should be made to a target probe 192 associated with the target container environment 190. The processing device 110 then clones the target container environment 190 two times to create a first cloned container environment 130a with a first clone probe 170a and a second cloned container environment 130b with a second clone probe 170b.

At block 404, the example processing device determines parameter values for probes based upon at least one performance metric of each computational container environment of the plurality of computational container environments. For example, because the performance metric 150 (e.g. a rate of request diversions) of the target container environment 190 is too high, the processing device 110 may raise a first parameter value 160a of the first clone probe 170a and a second parameter value 160b of the second clone probe 170b, each indicative of a number of requests in a queue that will trigger a request diversion. A magnitude of adjustment may be determined algorithmically. For example, the magnitude of the increase may be proportional to a magnitude of deviation of the performance metric 150 (e.g. a rate of request diversions) from the window of values 140. The adjustment may be iterated until the performance metric 150 (e.g. a rate of request diversions) is within the window of values 140. It will be appreciated that any number of cloned containers may be employed, and that employing additional containers may provide quicker adjustment of parameter values at the expense of running additional containers.

At block 406, the example processing device aggregates parameter values from each computational container environment of the plurality of computational container environments. For example, the first parameter values 160a and the second parameter values 160b may differ slightly, as they may both be within the window of values 140. In this example, the processing device 110 averages the first parameter values 160a and the second parameter values 160b to create aggregated values.

A number of strategies may be employed to aggregate these values, including but not limited to finding a highest value (possibly useful if performance tends to degrade in a direction that requires upwards adjustment of the parameter), finding a lowest value (possibly useful if performance tends to degrade in a direction that requires downwards adjustment of the parameter), averaging the values, and generating a weighted average of the values.

At block 408, the example processing device applies the aggregated parameter values to the target container environment. For example, the processing device 110 may replace the target parameter values 194 with the aggregated parameter values created at block 406, then continue execution of the target container environment 190.

At block 410, the example processing device monitors the target container environment to ensure that the performance metrics are within the predefined window. For example, the processing device 110 may continue to monitor the performance metrics 150 (e.g. a rate of request diversions) of the target container environment 190, and responsive to a deviation from the window of values 140, may repeat blocks 404 through 408.

FIG. 5 illustrates a flowchart for an example method for adjusting parameter values based upon current deviation from a desired behavior, according to example embodiments of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, one or more blocks may be repeated, and some of the blocks described are optional. The method 500 may be performed by processing logic that may comprise hardware (circuitry, dedicated logic, etc.), software, or a combination of both.

At block 502, an example processing device determines that one or more measured performance metrics are outside of one or more predefined windows of values. For example, the processing device 110 may determine that a target container environment 190 running a large language model is exhibiting two performance metrics 150 (e.g. a rate of request processing and a rate of request diversions) outside of a predetermined window of values 140 (e.g. the rate of request processing is 5% too low and the rate of request diversions is 5% too high).

At block 504, the example processing device makes incremental adjustments to parameter values in a direction that is based upon the measured performance metrics. For example, the processing device 110 may apply proportional-integral-derivative control theory to the target parameter values 194 with the performance metrics 150 as an input. In this scenario, the processing device 110 lowers a first target parameter value 194 (e.g. a period of time after restart in which the target container environment 190 does not accept requests is lowered by one millisecond) and raises a second target parameter value 194 (e.g. a threshold value indicative of a number of requests in a queue that will cause request diversion is raised by five requests).

At block 506, the example processing device determines that one or more measured performance metrics are outside of the window of values by at least a threshold value. For example, the processing device 110 may determine that the performance metrics 150 are 10% lower and greater, respectively, than a lower bound and an upper bound, respectively, of the windows of values 140.

At block 508, the processing device may make coarse adjustments to parameter values in a direction that is based upon the measured performance values. For example, the processing device 110 lowers the first target parameter value 194 by a larger amount than at block 504 (e.g. a startup time, which is a period of time after restart in which the target container environment 190 does not accept requests, is lowered by three milliseconds) and raises the second target parameter value 194 by a larger amount than at block 504 (e.g. a readiness threshold value indicative of a number of requests in a queue that will cause request diversion is raised by ten requests). It will be appreciated that in the present example which employs proportional-integral-derivative control, the threshold at block 506 may be arbitrarily chosen, since deviations from the window of values 140 will produce an adjustment proportional to those deviations, and thus larger deviations will produce larger adjustments than smaller deviations.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as infrastructure processing units (IPUs), graphical processing units (GPUs), data processing units (DPUs), ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed:

1. A method, comprising:
   identifying a computational container environment that is operating outside of at least one predefined window of values of at least one performance metric, wherein the computational container environment comprises a probe that is configured to perform an action comprising restarting the computational container environment responsive to detecting that the computational container environment is operating above or below at least one parameter value, wherein the computational container environment is a cloned copy of a target container environment;
   automatically adjusting the at least one parameter value of the probe based upon the at least one performance metric, wherein a magnitude of the adjusting of the at least one parameter value is proportional to a deviation of the at least one performance metric from the at least one predefined window of values; and
   determining, subsequent to automatically adjusting the at least one parameter value of the probe, that the computational container environment is operating within the at least one predefined window of values,
   wherein a plurality of cloned copies of the target container environment are created and executed, and wherein at least one parameter value is applied to the target container environment based upon an aggregation of adjusted parameter values of each cloned copy of the plurality of cloned copies.

2. The method of claim 1, further comprising:
   continuing to monitor the computational container environment; and
   repeating the automatically adjusting the at least one parameter value of the probe responsive to determining that the computational container environment is operating outside of the at least one predefined window of values.

3. The method of claim 1, wherein the at least one parameter value includes at least one of a startup time threshold, a readiness threshold, or a liveness threshold.

4. The method of claim 1, wherein the at least one performance metric includes at least one of a startup time, a readiness value, or a liveness value.

5. The method of claim 1, wherein the action performed by the probe further comprises modifying traffic to the computational container environment responsive to the computational container environment operating above or below the at least one parameter value.

6. The method of claim 1, wherein adjusting the at least one parameter value of the probe includes altering the at least one parameter value linearly based upon the at least one performance metric.

7. The method of claim 1, wherein adjusting the at least one parameter value of the probe includes altering the at least one parameter value algorithmically based upon the at least one performance metric.

8. The method of claim 1, further comprising:
   generating the cloned copy of the target container environment responsive to identifying that the target container environment is operating outside of the at least one predefined window of values, wherein the probe is a first probe that is a clone of a second probe in the target container environment; and
   responsive to determining that the computational container environment is operating within the at least one predefined window of values, applying the adjusted at least one parameter value of the first probe to the second probe of the target container environment.

9. The method of claim 1, wherein the computational container environment is one of a container, a pod, or a cluster.

10. A system, comprising:
   a memory; and
   a processing device, operatively coupled to the memory, configured to execute instructions stored in the memory to cause the processing device to:
      identify a computational container environment that is operating outside of at least one predefined window of values of at least one performance metric, wherein the computational container environment comprises a probe that is configured to perform an action comprising restarting the computational container environment responsive to detecting that the computational container environment is operating above or below at least one parameter value, wherein the computational container environment is a cloned copy of a target container environment;
      automatically adjust the at least one parameter value of the probe based upon the at least one performance metric, wherein a magnitude of the adjusting of the at least one parameter value is proportional to a deviation of the at least one performance metric from the at least one predefined window of values; and
      determine, subsequent to automatically adjusting the at least one parameter value of the probe, that the computational container environment is operating within the at least one predefined window of values,
      wherein a plurality of cloned copies of the target container environment are created and executed, and wherein at least one parameter value is applied to the target container environment based upon an aggregation of adjusted parameter values of each cloned copy of the plurality of cloned copies.

11. The system of claim 10, wherein the processing device is further configured to:
   continue to monitor the computational container environment; and
   repeat the automatically adjusting the at least one parameter value of the probe responsive to a determination that the computational container environment is operating outside of the at least one predefined window of values.

12. The system of claim 10, wherein the computational container environment is one of a container, a pod, or a cluster.

13. The system of claim 10, wherein the at least one parameter value includes at least one of a startup time threshold, a readiness threshold, or a liveness threshold.

14. The system of claim 10, wherein the at least one performance metric includes at least one of a startup time, a readiness value, or a liveness value.

15. The system of claim 10, wherein the processing device is further configured to:
   generate the cloned copy of the target container environment responsive to identifying that the target container environment is operating outside of the at least one predefined window of values, wherein the probe is a first probe that is a clone of a second probe in the target container environment; and responsive to determining that the computational container environment is operating within the at least one predefined window of values, apply the adjusted at least one parameter value of the first probe to the second probe of the target container environment.

16. A non-transitory computer-readable medium storing instructions which, when executed by a processing device, cause the processing device to:

identify a computational container environment that is operating outside of at least one predefined window of values of at least one performance metric, wherein the computational container environment comprises a probe that is configured to perform an action comprising restarting the computational container environment responsive to detecting that the computational container environment is operating above or below at least one parameter value, wherein the computational container environment is a cloned copy of a target container environment;

automatically adjust the at least one parameter value of the probe based upon the at least one performance metric, wherein a magnitude of the adjusting of the at least one parameter value is proportional to a deviation of the at least one performance metric from the at least one predefined window of values; and determine, subsequent to automatically adjusting the at least one parameter value of the probe, that the computational container environment is operating within the at least one predefined window of values, wherein a plurality of cloned copies of the target container environment are created and executed, and wherein at least one parameter value is applied to the target container environment based upon an aggregation of adjusted parameter values of each cloned copy of the plurality of cloned copies.

17. The non-transitory computer-readable medium of claim 16, storing further instructions which cause the processing device to:

continue to monitor the computational container environment; and repeat the automatically adjusting the at least one parameter value of the probe responsive to a determination that the computational container environment is operating outside of the at least one predefined window of values.

18. The non-transitory computer-readable medium of claim 16, storing further instructions which cause the processing device to adjust the at least one parameter value by altering the at least one parameter value of the probe algorithmically based upon the at least one performance metric.

19. The non-transitory computer-readable medium of claim 16, wherein the computational container environment is one of a container, a pod, or a cluster.

20. The non-transitory computer-readable medium of claim 16, storing further instructions which cause the processing device to:

generate the cloned copy of the target container environment responsive to identifying that the target container environment is operating outside of the at least one predefined window of values, wherein the probe is a first probe that is a clone of a second probe in the target container environment; and responsive to determining that the computational container environment is operating within the at least one predefined window of values, apply the adjusted at least one parameter value of the first probe to the second probe of the target container environment.

* * * * *